United States Patent [19]

Gomez et al.

[11] Patent Number: 4,920,789
[45] Date of Patent: May 1, 1990

[54] METHOD AND MEANS FOR DETERMINING AIR MASS IN A CRANKCASE SCAVENGED TWO-STROKE ENGINE

[75] Inventors: Aparicio J. Gomez, Birmingham; Douglas E. Trombley, Warren; Kenneth J. Buslepp, Utica, all of Mich.

[73] Assignee: General Motors Corporation, Detroit, Mich.

[21] Appl. No.: 409,377

[22] Filed: Sep. 19, 1989

[51] Int. Cl.$^5$ ............................................. G01M 15/00
[52] U.S. Cl. .................................... 73/118.2; 123/478
[58] Field of Search .......................... 73/118.2; 117.3; 123/65 R, 478; 364/431.05

[56] References Cited

U.S. PATENT DOCUMENTS

| | | | |
|---|---|---|---|
| 4,402,294 | 9/1983 | McHugh et al. | 123/480 |
| 4,446,523 | 5/1984 | Reinke | 364/431.05 |
| 4,461,260 | 7/1984 | Nonaka et al. | 123/478 |
| 4,664,090 | 5/1987 | Kabasin | 123/494 |
| 4,750,352 | 6/1988 | Kolhoff | 73/117.3 |
| 4,788,854 | 12/1988 | Javaherian | 73/117.3 |

Primary Examiner—Jerry W. Myracle
Attorney, Agent, or Firm—Howard N. Conkey

[57] ABSTRACT

A method and means are described for determining the mass of air available for combustion within a cylinder of a crankcase scavenged two-cycle engine, without the use of a mass-air flow sensor. This is achieved by estimating the mass of air under compression within a crankcase chamber, prior to its transfer to a cylinder combustion chamber during the engine operating cycle. The estimate for air mass is based upon the polytropic behavior of a portion of the crankcase compression process, and the pressure, volume and temperature of the air at two predetermined engine rotational positions during the polytropic phase of compression. The volume of the air within the crankcase chamber is determined as a function of engine rotational angle, with crankcase air temperature being derived as a function of intake air temperature. Air pressure during the polytropic phase of compression is sensed with a pressure sensor disposed within the crankcase chamber. The estimate for air mass is corrected to account for air leakage and imperfect transference of the air between the crankcase and combustion chambers.

9 Claims, 3 Drawing Sheets

METHOD AND MEANS FOR DETERMINING AIR MASS IN A CRANKCASE SCAVENGED TWO-STROKE ENGINE

BACKGROUND OF THE INVENTION

This invention relates to the determination of engine mass air-flow and more particularly to a method and means for determining the mass of air available for combustion within a cylinder of a crankcase scavenged two-stroke engine as a function of the pressure, volume, and temperature of the air undergoing a substantially polytropic phase of compression in a crankcase chamber, prior to its transfer to the cylinder combustion chamber.

In a crankcase scavenged two-stroke engine, each cylinder has a separate crankcase chamber into which air is inducted during a portion of the engine operating cycle. This inducted air is compressed during part of the engine cycle, when the crankcase chamber is decreasing in volume due to the downstroke of the piston within the cylinder, and is then transferred to the cylinder combustion chamber where it is mixed with fuel for ignition.

In order to effectively control the emission and performance characteristics of crankcase scavenged two-stroke engines, it is necessary to know the mass of air available at the time of combustion within a cylinder. Once such information is known, critical engine parameters, such as spark advance, fueling requirements, and injector timing, can be adjusted to achieve the desired emission and performance objectives.

Mass air-flow sensors are commercially available, and have been used with internal combustion engines in the past to provide the required information regarding the air mass available for combustion. However, at the present time, mass-air flow sensors with sufficient accuracy are relatively expensive as compared to other sensors used for engine control.

One prior technique for determining cylinder mass air in a crankcase scavenged, two-stroke engine is described in U.S. application Ser. No. 377,383, filed July 10, 1989, which is copending with the present application and assigned to the same assignee. There, the mass of air available for combustion within a cylinder is obtained by determining the mass of air undergoing compression within a crankcase chamber, prior to its transfer to the associated cylinder combustion chamber. In determining the air mass in the crankcase chamber, the pressure of the air undergoing compression in the crankcase must be integrated with respect to the decreasing crankcase volume. Consequently, a numerical integration of sampled crankcase pressure is required when implementing the technique via a computerized engine control system. Although this prior technique satisfactorily eliminates any need for a mass air-flow sensor in the control of the two-stroke engine, it does require the integration of several samples of crankcase pressure, employing a significant amount of computer processing time, which is generally at a premium with the present state of the engine control art. The present invention provides an alternative mass air-flow measuring technique.

SUMMARY OF THE INVENTION

According to one aspect of the invention, the mass of air available for combustion within a cylinder is obtained by estimating the mass of air under compression within a crankcase chamber, prior to its transfer to the associated cylinder combustion chamber, which is also done in the above mentioned prior technique. However, the present invention goes beyond the prior technique in recognizing that during a portion of this compression process, the air behaves in an essentially polytropic fashion such that $PV^n$ is substantially constant, where P and V are respectively the pressure and volume of the air within the crankcase chamber, and n is the polytropic exponent characterizing the polytropic phase of compression. Based upon this recognition, an estimate for the mass of air contained within the combustion chamber can be obtained by determining the pressure, volume, and temperature of the air within the crankcase chamber, at only two predetermined states during polytropic compression, along with the value for the polytropic exponent. Consequently, the present invention eliminates the need for any numerical integration of crankcase pressure and provides a simplified method for determining the air mass per cylinder available for combustion. As a result, only minimal computer processing time is required when the present invention is implemented in a typical engine control system.

In another aspect of the invention, the temperature of air within the crankcase is derived as a function of the engine intake air temperature. Again, because a portion of the crankcase compression is polytropic, the temperature of air at the second predetermined state can be derived explicitly as a function of the air temperature at the first state. Then, the air temperature at both states can be derived as a function of the intake air temperature, which approximates the crankcase air temperature at the first state, near the beginning of polytropic compression. By using the intake air temperature, a more accurate estimate for the air mass within the crankcase can be obtained (since typical temperature sensors have long lag times with respect to engine cycle time, and therefore, lead to greater uncertainty in the measurement of crankcase air temperature as compared to the measurement of intake air temperature). Also, typical engine control systems usually have a preexisting means for measuring intake air temperature, so no additional hardware is required for obtaining an indication of the crankcase air temperature during polytropic compression.

As contemplated by a further aspect of the invention, the estimated mass of air transferred to a combustion chamber is corrected to account for air leakage out of the crankcase and combustion chambers, and for the imperfect transference of the mass or air from the crankcase to the combustion chamber. This compensation results in improved accuracy when determining the air mass per cylinder available for combustion according to the present invention.

Preferably, the volume of air within the crankcase is determined as a function of engine cycle position. Since the design of the engine establishes the physical size and mechanical relationship of engine components, the volume within the crankcase can be determined apriori in terms of the angular rotation of the engine crankshaft. Again, typical engine control systems usually have an existing means for determining the rotational position of the engine crankshaft, so additional sensors are generally not required by the invention in order to determine crankcase volume during engine operation.

Further, the pressure of air within the crankcase may be sensed with an inexpensive pressure sensor which is the only addition necessary to a typical engine control system to enable the determination of the mass of air in accordance with the present invention.

These and other aspects and advantages of the invention may be best understood by reference to the following detailed description of a preferred embodiment when considered in conjunction with the accompanying drawing.

DESCRIPTION OF THE PREFERRED EMBODIMENT

Figure 1:
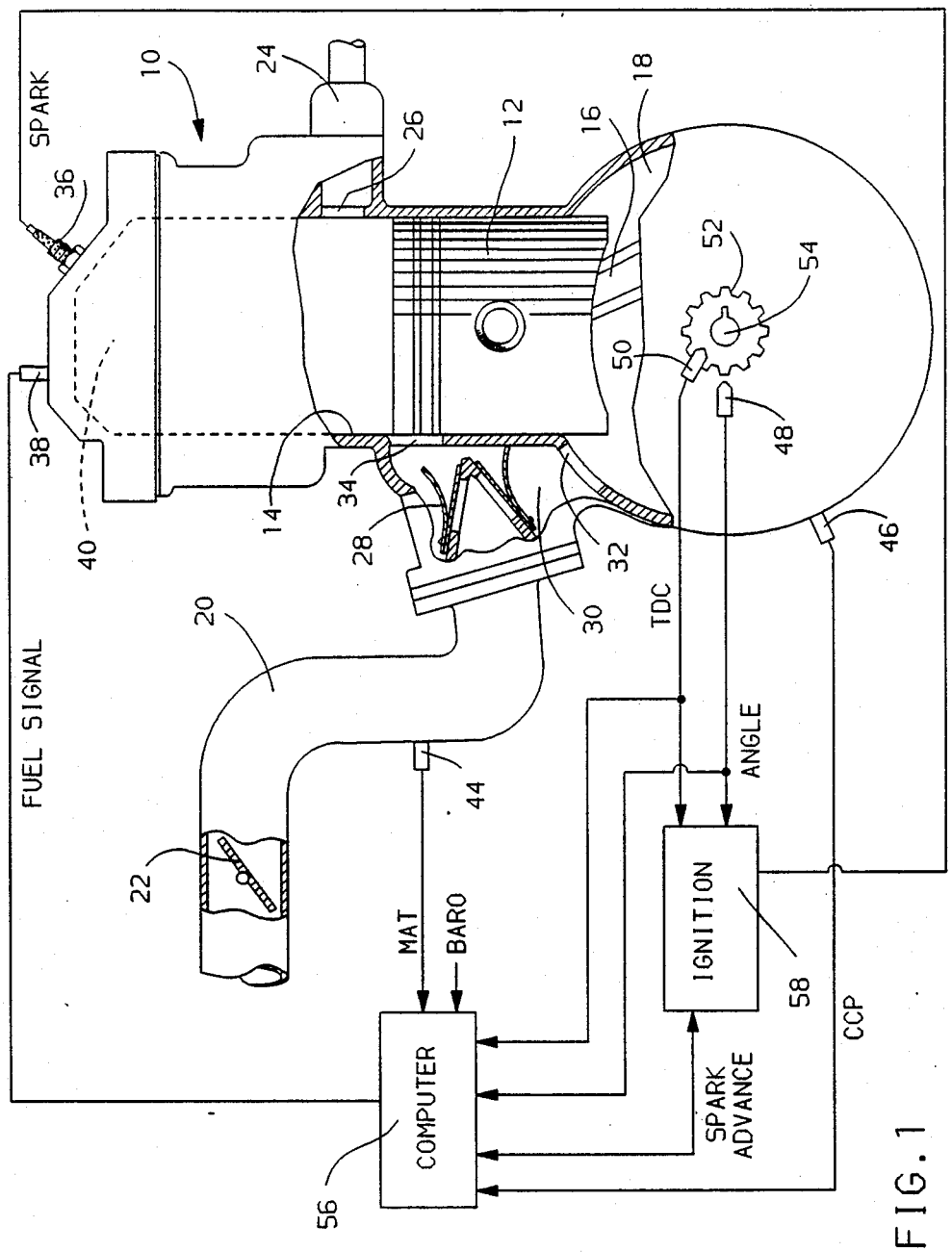
FIG. 1 is a schematic diagram of one cylinder of a crankcase scavenged two-stroke engine and an control system therefore, that includes the system for determining the mass of air per cylinder available for combustion in accordance with the principles of this invention.

Referring to FIG. 1, there is shown schematically a crankcase scavenged two-stroke engine, generally designated as 10, with a portion of the engine exterior cut away, exposing cylinder 14. Piston 12 resides within the wall of cylinder 14, with rod 16 connecting piston 12 to a rotatable crankshaft, not shown, but disposed within crankcase chamber 18. Connected to engine 10 is an air intake manifold 20 with a throttle 22, and an exhaust manifold 24. Cylinder 14 communicates with exhaust manifold 24 through exhaust port 26 in the wall of cylinder 14. Intake manifold 20 communicates with cylinder 14 and crankcase chamber 18 through a reed valve checking mechanism 28, which opens into a common air transfer passage 30 linking crankcase port 32 with inlet port 34 in the wall of cylinder 14. Cylinder 14 is provided with a spark plug 36 and an electric solenoid driven fuel injector 38 projecting into combustion chamber 40.

Associated with engine 10 are various conventional sensors known to the art, which provide typical signals related to engine control. Located within the air intake manifold 20 is a temperature sensor 44 for measuring manifold air temperature (MAT). Another sensor, not shown in FIG. 1, provides a signal related to the atmospheric barometric pressure (BARO) for use in controlling engine 10. Electromagnetic sensors 48 and 50 provide pulsed signals indicative of crankshaft rotational angle (ANGLE) and the top dead center (TDC) position for cylinder 14, by respectively sensing movement of the teeth on ring gear 52 and disk 54, which are attached to the end of the engine crankshaft.

The rotational position of the crankshaft from top dead center in cylinder 14 may be obtained by counting the number of pulses occurring in the ANGLE signal after the TDC pulse, then multiplying that count by the angular spacing of the teeth on ring gear 52. Also, the engine speed in revolutions per minute (RPM) may be obtained by counting the number of TDC pulses which occur in a specified period of time, then multiplying by the appropriate conversion constant.

Computer 56 is a conventional digital computer used by those skilled in the art for engine control, and includes the standard elements of a central processing unit, random access memory, read only memory, analog-to-digital converter, input/output circuitry, and clock circuitry. Signals from the previously mentioned sensors flow over the indicated paths and serve as inputs to computer 56. Using these inputs, computer 56 performs the appropriate computations, and provides an output FUEL SIGNAL to fuel injector 38 and an output SPARK ADVANCE signal to ignition system 58.

Ignition system 58 generates a high voltage SPARK signal, which is applied to spark plug 36 at the appropriate time, as determined by the SPARK ADVANCE signal supplied by computer 56 and the position of the engine crankshaft given by the ANGLE and TDC input signals. Ignition system 58 may include a standard distributor or take any other appropriate form in the prior art.

The operation of engine 10 will now be briefly described based upon the cycle occurring in cylinder 14. During the upstroke, piston 12 moves from its lowest position in cylinder 14 toward top dead center. During the upward movement of piston 12, air inlet port 34 and exhaust port 26 are closed off from the combustion chamber 40, and thereafter, air is inducted into crankcase chamber 18 through reed valve 28. Air in combustion chamber 40, above piston 12, is mixed with fuel from injector 38 and compressed until spark plug 36 ignites the mixture near the top of the stroke. As combustion is initiated, piston 12 begins the downstroke, decreasing the volume of crankcase chamber 18 and the air inducted therein, due to closure of reed valve 28. Toward the end of the downstroke, piston 12 uncovers exhaust port 26 to release the combusted fuel, followed by the uncovering of inlet port 34, enabling compressed air within the crankcase chamber 18 to flow through the air transfer passage 30 into cylinder 14. The cycle begins anew when piston 12 reaches the lowest point in cylinder 14.

In order to effectively control the emission and performance characteristics of the crankcase scavenged, two-stroke engine 10, it is necessary to know the mass of air available in cylinder 14 at the time of combustion. Once this information is known, critical engine parameters such as spark advance, fueling requirement, and injector timing can be adjusted to achieve the engine emission and performance objectives.

Figure 2:
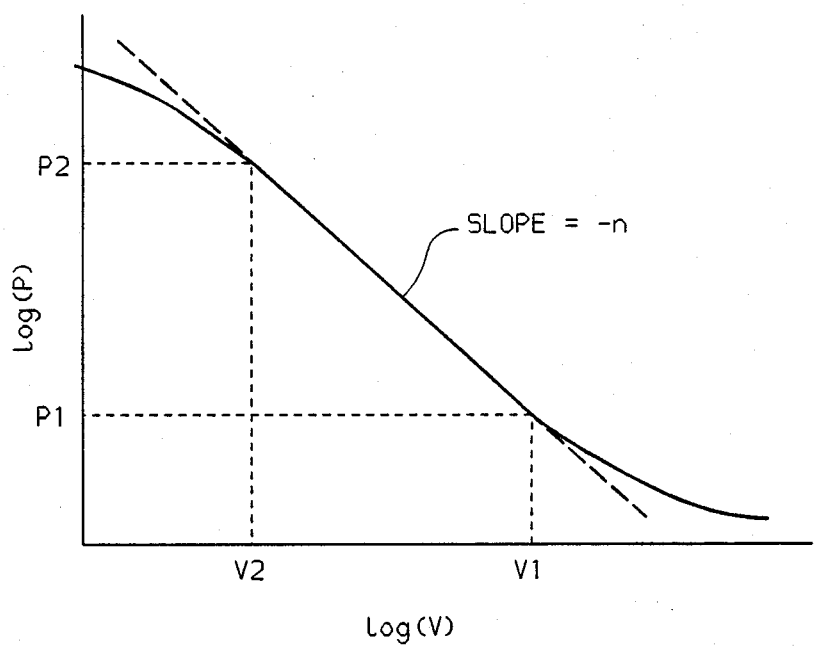
FIG. 2 is a logarithmic graphical representation of crankcase pressure versus crankcase volume illustrating a linear region where compression of air within the crankcase is substantially polytropic.

Referring now to FIG. 2, there is shown a typical graph of the logarithm of the pressure P of air inducted into crankcase chamber 18 versus the logarithm of crankcase volume V during the engine operating cycle when the air is compressed within the crankcase. Applicants have recognized that for a given engine load and rotational speed, the log(P) is approximately linearly dependent upon the log(V) during a portion of the compression process occurring within the engine crankcase chamber, indicating a substantially polytropic phase of compression. A polytropic process is one in which the pressure and the volume of the subject gas, air in this case, behave such that $PV^n$ is constant, where n is a number defined as the polytropic exponent. This polytropic behavior exists over the expected range of engine operation; however, the value of the polytropic exponent n varies with engine loading and rotational speed, and its value is given by the negative of the slope of the linear region of the curve as shown in FIG. 2. Two states of the crankcase air are indicated by V1 and V2 along with the associated pressures P1 and P2 in FIG. 2. In what follows, these two states may be chosen any-where along the linear region of the curve, but preferably, they are selected near the beginning and end of the polytropic phase of compression.

Assuming the foregoing polytropic phase of compression within the crankcase chamber 18, the mathematical basis underlying the invention can be derived in respect to determination of the air mass available for combustion within the cylinder 14.

The mathematical equations, upon which the present invention is based, will now be derived with respect to determining the mass of air available for combustion within cylinder 14 based upon the polytropic phase of compression of air within crankcase chamber 18, prior to its transfer to combustion chamber 40.

Since the pressure of air P under compression within crankcase chamber 18 never exceeds the critical pressure, it can be assumed that the air behaves as an ideal gas, and the derivation begins with the First Law of Thermodynamics, $$W(1 \rightarrow 2) = (U2 - U1) - Q(1 \rightarrow 2), \quad (1)$$

where Q is the heat transferred out of the crankcase chamber 18, W is the work done in compressing the air within the crankcase chamber 18, and (U2−U1) is the change in internal energy of the air from state 1 to state 2, while under compression. Since the temperature gradient across the wall of crankcase chamber 18 is small (the initial temperature of air inducted into the crankcase 18 is approximately ambient) and at the compression process is relatively fast compared to the rate of heat transfer, the net heat transfer out of crankcase chamber 18 is approximately zero. Therefore, equation (1) can be written as:

$$W = U2 - U1. \quad (2)$$

From the definition of work done on a gas under compression:

$$W = \int_{V1}^{V2} PdV, \quad (3)$$

where dV is the differential change in crankcase volume, P is crankcase pressure, V1 is the volume of the air at state 1 near the beginning of compression and V2 is the volume of the air at state 2 toward the end of compression. Also, from the definition of internal energy, $$U2 - U1 = M^*(u2 - u1), \quad (4)$$

where M is the mass of air in crankcase chamber 18, and u2−u1 the change in the specific internal energy of the air under compression from state 1 to state 2. From equations (2)—(4), the mass of air M within crankcase chamber 18 is given by:

$$M = \int_{V1}^{V2} PdV/(u2 - u1). \quad (5)$$

For an ideal gas, the change in the specific internal energy of the air is given by:

$$u2 - u1 = Cv^*(T2 - T1), \quad (6)$$

where Cv is the specific heat capacity of the air at constant volume, T1 is the temperature of the air at state 1, and T2 is the temperature of the air at state 2. Combining equations (5) and (6) gives $$M = \int_{V1}^{V2} PdV/\{Cv^*(T2 - T1)\}, \quad (7)$$

where the air mass M within crankcase chamber 18 is given by integrating the pressure of the air P with respect to the change in volume of the air from V1 to V2, during that portion of the engine cycle when the air is being compressed within crankcase chamber 18, and dividing that result by the product of the specific heat capacity of air and the difference in temperature of the air (T2−T1), at the respective volumes V2 and V1. Equation (7) forms the basis for a method of determining cylinder mass air as disclosed in U.S. application Ser. No. 377,383, filed July 10, 1989, which is copending with the present application and assigned to the same assignee. Although the previously disclosed method enables the determination of cylinder mass air without the use of a mass air-flow sensor, a significant amount of computer processing time is required to sample crankcase pressure and perform a numerical integration equivalent to the integral present in equation (7). The present invention goes beyond the above described technique in recognizing that during a portion of the compression process occurring within the crankcase chamber, the air behaves in essentially a polytropic fashion, resulting in a simplified method for determining cylinder mass air.

For the special case when states 1 and 2 occur during that portion of compression which is substantially polytropic, the work in compressing the air is given simply by $$W = \int_{V1}^{V2} PdV = [P2^*V2 - P1^*V1]/(n - 1), \quad (8)$$

which when substituted into equation (7) gives $$M = [P2^*V2 - P1^*V1]/[(n-1)^*Cv^*(T2-T1)]. \quad (9)$$

Thus, equation (9) gives the air mass M within crankcase chamber 18 in terms of the pressure, volume, and temperature of the air at states 1 and 2 during polytropic compression, along with the value of the polytropic exponent n, which is a function of the speed and load of the engine 10. If the mass of air within crankcase chamber 18 is determined based on equation (9) rather than (7), the solution to an integral is not required. In order to numerically compute the value of the integral present in equation (7), a relatively large number of samples of crankcase pressure and volume would be required, whereas equation (9) requires only two samples of crankcase pressure and volume. Thus, recognition of the fact that a portion of the compression process is polytropic simplifies the implementation of the present invention and reduces computer processing time, which is generally at a premium with the current state of the engine control art.

A conventional temperature sensor could be used to measure the difference in temperature (T2−T1) within the crankcase 18, however, temperature sensors typically have long response times relative to the time required for the compression process, making it difficult to obtain an accurate measurement of for (T2−T1). To solve this problem, the difference in temperature (T2−T1) in equation (9) is derived in terms of the intake air temperature (MAT) eliminating the necessity for a crankcase temperature sensor. This is accomplished by first assuming that the crankcase air temperature T1, at state 1 near the start of compression, is approximately equal to the air intake temperature as derived from the MAT signal. This is reasonable since state 1 occurs near the beginning of compression, prior to any significant increase in the air temperature due to the compression process. In addition, for a polytropic process, the temperature T2 is a function of the temperature T1, as given by the expression $$T2 = T1*(V1/V2)^{n-1}. \tag{10}$$

Substituting equation (10) into equation (9), the mass of air M in crankcase chamber 18 can be expressed as $$M = [P2*V2 - P1*V1]/[(n-1)*Cv*T1*[(V1/V2)^{n-1} - 1]]. \tag{11}$$

Thus, the mass of air M is given by equation (11), where T1 is equated to the air intake temperature, the remaining terms P1, V1, P2, V2, and n are as described previously for equation (9). The preferred embodiment of the present invention, which implements a method and means for determining combustion chamber air mass based upon equation (11), will now be described.

In order to perform the computations required by equation (11), computer 56 must be provided with a means for sensing the air pressure within crankcase 18. In the preferred embodiment of the present invention, this requirement is satisfied by utilizing a pressure sensor 46 to measure the pressure within crankcase chamber 18, and develop a corresponding signal CCP for input to computer 56. Pressure sensor 46 may be any type of known pressure sensor capable of sensing the crankcase air pressure, and would typically be located as near as possible to the crankcase to minimize any delay in the propagation of pressure waves from the crankcase.

With the exception of pressure sensor 46, computer 56 has all of the other necessary inputs, from the conventional engine control system described previously, to enable computation of the mass of air M given by equation (11).

Temperature sensor 44 located in the intake manifold 20 measures the manifold air temperature and provides signal MAT, which is the equivalent of the temperature T1 required in equation (11).

Based upon the mechanical design of engine 10, the volume of crankcase chamber 18 can be determined directly as a function of the engine cycle position indicated by the angular rotation of the crankshaft from top dead center as derived from the pulsed signals ANGLE and TDC from electromagnetic sensors 48 and 50.

Figure 3:
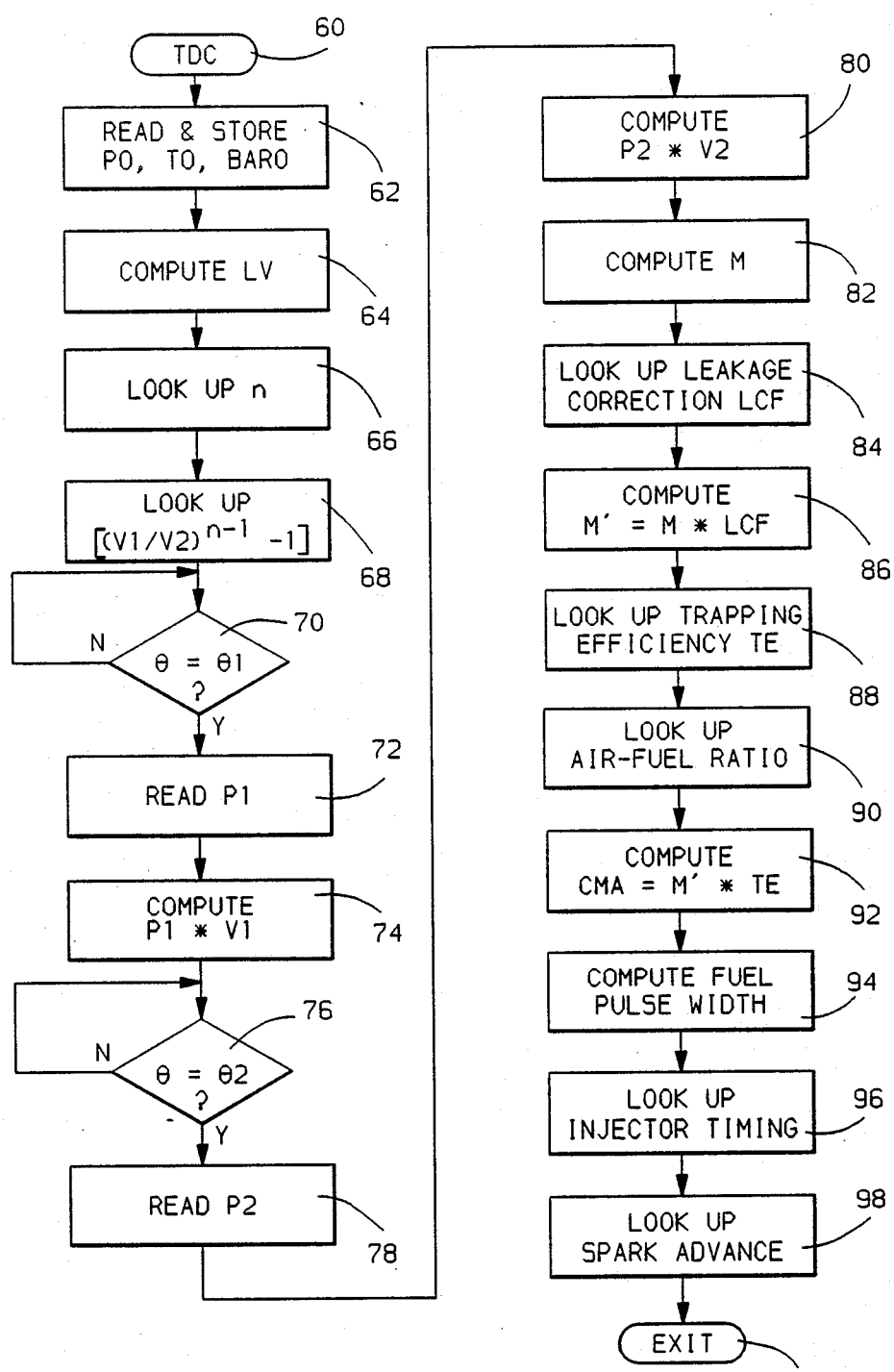
FIG. 3 is a flow diagram representing program instructions executed by the computer in FIG. 1 in determining the mass of air available for combustion in accordance with the principles of this invention.

For each occurrence of top dead center in cylinder 14, computer 56 responds by initiating a program stored in memory. The program computes the mass of air M according to equation (11), makes corrections for air leakage and imperfect air transference, and thereafter, computes engine control outputs for the cylinder based upon the corrected estimate of mass air available for the next ignition event. The flow diagram of FIG. 3 illustrates the steps in the stored routine which are executed by computer 56. Programming of computer 56 to implement this series of steps will be clear to any programmer skilled in the art of engine control.

Referring now to the flow diagram of FIG. 3, the routine is entered at step 62 with the occurrence of top dead center in cylinder 14. The program begins at step 62 where the computer reads and stores initial conditions by sampling input signals CCP, MAT, and BARO, and assigning these values as P0, T0, and BARO respectively. P0 is the initial crankcase air pressure, and T0 is the initial crankcase air temperature, both determined just prior to the start of compression within crankcase chamber 18. P0 is also indicative of the pressure within intake manifold 20, since reed valve 28 is not yet closed when top dead center occurs in cylinder 14. The variable BARO represents the atmospheric barometric pressure at which the engine is operating.

The program next proceeds to step 64 where a fuel based load variable LV is computed by multiplying the current value of FPW, the fuel pulse width of the output FUEL SIGNAL, by a constant representing the rate at which injector 38 delivers fuel to cylinder 14 when enabled by the pulse. The current value of LV then represents the amount of fuel supplied to cylinder 14 during the previous combustion event and is indicative of engine loading. At engine start up, the fuel pulse width FPW for computing LV is initialized to an appropriate value, and is thereafter updated with each execution of step 94, which occurs later in this routine.

At step 66, a value for the polytropic exponent n is looked up in a table permanently stored in the read only memory of computer 56 as a function of the fuel based load variable LV, determined at step 64, and the current engine speed. As described previously, computer 56 regularly computes and updates an engine speed variable outside the present routine, by counting the occurrence of TDC pulse in a predetermined time interval and then multiplying by the appropriate conversion constant. Values for n in the lookup table are determined by the slope of the linear portion of logarithmicly plotted crankcase pressure-volume curves obtained through experimental measurements obtained using a standard engine dynamometer known to those skilled in the art of engine control.

Next at step 68, a value for the quantity:

$$[(V1/V2)^{n-1} - 1]$$

is looked up in a table permanently stored in the memory of computer 56 as a function of the value of the polytropic exponent n found in the previous step 66. The value for V1 and V2 are are also stored in memory and represent the volume of the crankcase chamber at predetermined angles of engine rotation associated with the respective states 1 and 2, during the polytropic phase of compression within the crankcase. The above defined quantity is looked up in a table rather than computing its value in order to conserve computer processing time.

At step 70, a decision is made as to whether the current rotational angle of the crankshaft $\theta$ is equal to the angle $\theta 1$, which corresponds to state 1 near the beginning of polytropic compression. The engine rotational angle $\theta$ is continuously computed and updated outside the present routine, using the TDC and ANGLE inputs as described previously. In the preferred embodiment of the present invention, $\theta 1$ has been assigned the value of 60 degrees ATDC (after top dead center) in cylinder 14. Applicants have found that this value for $\theta 1$ consistently occurs within the polytropic phase of crankcase compression over the expected range of speeds and loading encountered by the three-cylinder, 1.2 liter, two-stroke engine to which the preferred embodiment of the present invention has been applied. If the crankshaft has not rotated to 60 degrees ATDC, step 70 is repeated. When 60 degrees of rotation has been achieved, the next step 72 in the routine is executed.

At step 72, the value of the crankcase pressure indicated by input signal CCP is sampled and assigned to the variable P1. P1 then represent the value of crankcase air pressure at state 1 during the polytropic phase of compression, which is predetermined to occur when the crankshaft rotation equals 60 degrees ATDC.

Next at step 74, the product P1*V1 is computed by multiplying the value of P1 found at step 72 by the value of V1 for the volume of crankcase chamber 18 at state 1. The value for V1 is determined apriori based upon the engine design, for the crankshaft rotational angle corresponding to state 1, and is permanently stored in computer memory.

The program then proceeds to step 76, where a decision is required as to whether the crankshaft rotational angle $\theta$ is equal to $\theta 2$, which corresponds to state 2 during the polytropic phase of compression within crankcase chamber 18. For the preferred embodiment, the predetermined value for $\theta 2$ is 120 degrees ATDC, which has been found by applicants to consistently occur within the polytropic portion of compression for the expected range of engine speeds and loading. If the current engine rotational angle is not equal to 120 degrees, step 76 is repeated until 120 degrees of rotation is attained, after which the program proceeds to the next step 78 in the routine. Note that in the preferred embodiment of the present invention, $\theta 1$ and $\theta 2$ are chosen such that the corresponding states 1 and 2 occur near the beginning and end of the polytropic phase of compression. Other embodiments are possible having different values for $\theta 1$ and $\theta 2$ limited only by the accuracy in determining the crankcase pressure and volume at these angles.

At step 78, the current value of the input signal CCP from pressure sensor 46 is sampled and assigned to the variable P2, which represents the crankcase air pressure at state 2 during the polytropic phase of compression.

Next at step 80, the product P2*V2 is computed by multiplying the value of P2 found at step 78 by the value for the volume V2 of crankcase chamber 18, at state 2. As stated previously, this value for V2 is predetermined based upon the engine design, for the crankshaft rotational angle corresponding to state 2, and is permanently stored in computer memory.

The program then proceeds to step 82 where the value for the mass air M within crankcase chamber 18 is computed according to equation (11), using the quantities computed previously at steps 66, 68, 74, and 80. In addition, the value for Cv required in equation (11) is a constant permanently stored in computer memory. The temperature T1 of the crankcase air at state 1 is equated to the intake air temperature T0 determined previously at step 62.

At step 84, the program looks up a leakage correction factor LCF in a table permanently stored in memory, using the stored values for P0 and BARO determined at step 62. The leakage correction factor LCF represents the percentage of the mass of air M remaining within the crankcase chamber 18 at the end of compression, after air loss due to leakage through reed valve 28 and gaskets sealing the crankcase chamber. The stored values for the leakage correction factor are determined apriori as a function of the intake manifold pressure, as indicated by P0, and atmospheric barometric pressure BARO. The amount of air leakage through crankcase seals being a function of the difference between the crankcase pressure and BARO, while the amount of air leakage through the reed valve is a function of the difference between crankcase pressure and the pressure within intake manifold 20, as indicated by P0. In other embodiments of the invention, it may also be desirable to include a correction for leakage between adjacent engine crankcase chambers based upon the pressure differential between the chambers and engine speed, if such leakage becomes significant when the invention is applied to different engines.

At step 86, the program computes M', the mass of air contained within the crankcase after correction for leakage. The value for M, is computed by multiplying the value of M found at step 82 by the leakage correction factor LCF found at step 84, or $$M' = M*LCF. \tag{12}$$

At step 88, the program looks up a value for trapping efficiency TE in a table stored permanently in memory, using values for M,, calculated in the previous step 86, and the current engine speed in RPM, which is derived by counting the number of TDC pulses that occur in a given time period, also described previously. The trapping efficiency TE represents that percentage of the corrected mass air M' within crankcase chamber 18, which is transferred and captured within combustion chamber 40, after closure of air inlet port 34 and exhaust port 26. Values for trapping efficiency are determined apriori as a function of the mass of air M, in crankcase chamber 18, and the engine RPM, which is related to the time available for air to pass through inlet port 34 or be lost out exhaust port 26. The values for trapping efficiency are determined by standard engine dynamometer measurements known to those skilled in the art of engine control, as are the other conventional lookup tables referred to in this description. In other embodiments of the invention, it may also be desirable to compensate the trapping efficiency to correct for changes in the altitude of engine operation, variations in local barometric pressure, and changes in the engine exhaust system, which can affect the amount of mass air escaping out exhaust port 26, when it is uncovered.

Next at step 90, the appropriate air-fuel ratio A/F for cylinder 14 is looked up in a stored table, using values for the corrected mass air M' and the engine RPM. The desired values for the air-fuel ratio lookup table are determined by standard engine calibration procedures using an engine dynamometer.

At step 92, the mass of air CMA, which is available for combustion within cylinder 14, is computed by multiplying the corrected crankcase air mass M', found at step 86, by the trapping efficiency TE, found at step 88, according to the equation $$CMA = M'*TE. \tag{13}$$

In the remaining steps 94 through 98, the combustion chamber mass air CMA, found at the previous step 92, is used to compute standard engine control parameters. At step 94, the injector fuel pulse width FPW is computed according to the following:

$$FPW = K*CMA*[1/(A/F)], \quad (14)$$

where K is a predetermined units scaling constant stored in memory, CMA was found in step 92, and A/F was determined in step 90. The newly computed value for FPW replaces the previously stored value, and is the value that will be used at the next execution of step 64 in computing LV. Next, at step 96, the proper timing for the fuel pulse to injector 38 is looked up in the appropriate table stored in memory, based upon the value of the engine RPM and the combustion chamber mass air CMA. Using the computed values for fuel pulse width FPW and the injector timing, computer 56 provides the appropriate pulsed FUEL SIGNAL (see FIG. 1) to injector 38. Finally, at step 98, the correct spark advance for cylinder 14 is found in a stored lookup table as a function of engine RPM and combustion chamber mass air CMA. Computer 56 provides ignition system 58 with the SPARK ADVANCE signal so that spark plug 36 can be fired at the proper time in advance of top dead center for cylinder 14. After the above steps have been executed, the routine is exited at step 100.

The foregoing description of a preferred embodiment of the invention is for the purpose of illustrating the invention, and is not to be considered as limiting or restricting the invention, since many modifications may be made by the exercise of skill in the art without departing from the scope of the invention.

The embodiments of the invention in which an exclusive property or privilege is claimed are defined as follows:

1. In a crankcase scavenged two-stroke engine of the type in which, air is inducted into a crankcase chamber, is then subjected to compression during a portion of the engine cycle when the crankcase chamber shrinks in volume, and thereafter is transferred to a combustion chamber; an apparatus for determining the mass of air transferred to the combustion chamber based upon the occurrence of a polytropic phase of air compression within the crankcase chamber, the apparatus comprising:

means for sensing the pressure P of the air mass M within the crankcase chamber during the polytropic phase of compression;
means for determining the volume V of the crankcase chamber during the polytropic phase of compression;
means for deriving an indication of the temperature T of the air mass within the crankcase chamber during the polytropic phase of compression;
means for determining the polytropic exponent n for that portion of the engine cycle characterized by polytropic compression, where the expression $PV^n$ is substantially constant in value; and
means for deriving an indication of the mass of air transferred to the combustion chamber in accordance with the expression $$M = [P2*V2 - P1*V1]/[(n-1)*Cv*(T2-T1)],$$

where the sets (P1,V1,T1) and (P2,V2,T2) denote the respective pressure, volume, and temperature of air at predetermined states 1 and 2, which occur during polytropic compression, with Cv representing the specific heat capacity of air at constant volume.

2. The apparatus of claim 1, further including:
means for correcting the derived indication of air mass transferred to the combustion chamber to account for leakage of air from the crankcase chamber; and
means for correcting the derived indication of the air mass transferred to the combustion chamber to account for the imperfect transference of air from the crankcase chamber to the combustion chamber.

3. The apparatus of claim 2 in which the crankcase chamber volume during the polytropic phase of compression is determined as a function of engine cycle position.

4. The apparatus of claim 3, in which the temperature of the air within the crankcase during the polytropic phase of compression is derived as a function of the intake air temperature.

5. The apparatus of claim 1 in which the means for sensing the air pressure during the polytropic phase of compression comprises a pressure sensor disposed within the crankcase chamber.

6. In a crankcase scavenged two-stroke engine of the type in which, air is inducted into a crankcase chamber, is then subjected to compression during a portion of the engine cycle when the crankcase chamber shrinks in volume, and thereafter is transferred to a combustion chamber; a method for determining the mass of air transferred to the combustion chamber based on the occurrence of a polytropic phase of compression within the crankcase chamber, the method comprising the steps of:

sensing the pressure P of the air mass M within the crankcase chamber during the polytropic phase of compression;
determining the volume V of the crankcase chamber during the polytropic phase of compression;
deriving an indication of the temperature T of the air mass within the crankcase chamber during polytropic compression;
determining the polytropic exponent n for that portion of the engine cycle characterized by polytropic compression, where the expression $PV^n$ is substantially constant in value; and
deriving an indication of the mass of air transferred to the combustion chamber in accordance with the expression $$M = [P2*V2 - P1*V1]/[(n-1)*Cv*(T2-T1)],$$

where the sets (P1,V1,T1) and (P2,V2,T2) denote the respective pressure, volume, and temperature of air at predetermined states 1 and 2, which occur during polytropic compression, with Cv representing the specific heat capacity of air at constant volume.

7. The method of claim 6 further including the steps of:
correcting the derived indication of the air mass transferred to the combustion chamber to account for leakage of air from the crankcase chamber; and
correcting the derived indication of the air mass transferred to the combustion chamber to account for the imperfect transference of air from the crankcase chamber to the combustion chamber.

8. The method of claim 6 in which the temperature of the air within the crankcase during the polytropic phase of compression is derived as a function of the intake air temperature.

9. The method of claim 6 in which the crankcase chamber volume during the polytropic phase of compression is determined as a function of engine cycle position.

* * * * *